— (12) United States Patent
Murray et al.

(10) Patent No.: US 8,379,974 B2
(45) Date of Patent: Feb. 19, 2013

(54) CONVEX CLUSTERING FOR CHROMATIC CONTENT MODELING

(75) Inventors: Naila Murray, Arima (TT); Florent Perronnin, Domène (FR); Luca Marchesotti, Grenoble (FR); Sandra Skaff, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 261 days.

(21) Appl. No.: 12/975,753

(22) Filed: Dec. 22, 2010

(65) Prior Publication Data

US 2012/0163715 A1    Jun. 28, 2012

(51) Int. Cl.
*G06K 9/00* (2006.01)
(52) U.S. Cl. ........................................ 382/162
(58) Field of Classification Search .................. None
See application file for complete search history.

(56) References Cited

U.S. PATENT DOCUMENTS

| | | |
|---|---|---|
| 2003/0021481 A1 | 1/2003 | Kasutani |
| 2004/0009489 A1* | 1/2004 | Golub et al. ............ 435/6 |
| 2005/0246692 A1* | 11/2005 | Poteryakhin et al. ......... 717/140 |
| 2006/0075365 A1* | 4/2006 | Hershenson et al. ............. 716/2 |
| 2007/0005356 A1 | 1/2007 | Perronnin |
| 2007/0019884 A1* | 1/2007 | Jojic et al. .................... 382/284 |
| 2007/0258648 A1* | 11/2007 | Perronnin ..................... 382/224 |
| 2008/0069456 A1 | 3/2008 | Perronnin |
| 2008/0072183 A1* | 3/2008 | Hershenson et al. .............. 716/2 |
| 2008/0077890 A1* | 3/2008 | Hershenson et al. .............. 716/2 |
| 2008/0240572 A1 | 10/2008 | Hoshii |
| 2008/0317358 A1 | 12/2008 | Bressan et al. |
| 2009/0231355 A1 | 9/2009 | Perronnin |
| 2010/0040285 A1 | 2/2010 | Csurka et al. |
| 2010/0088073 A1 | 4/2010 | Perronnin et al. |
| 2010/0092084 A1 | 4/2010 | Perronnin et al. |
| 2010/0098343 A1 | 4/2010 | Perronnin et al. |
| 2010/0198564 A1* | 8/2010 | Tuma et al. ....................... 703/1 |

OTHER PUBLICATIONS

Perronnin et al. "Modeling images as mixtures of reference images," 2009 IEEE CVPR, Jun. 22-25, 2009, Miami Beach, FL. pp. 1770-1777.*
Freedman, et al. "Object-to-Object Color Transfer: Optimal Flows and SMSP Transformations," CVPR, 2010.
Lashkari, et al. "Convex clustering with examplar-based models," NIPS, 2007.
Tai, et al. "Soft color segmentation and its applications," IEEE PAMI, 2007.
Perronnin, et al., "Fisher Kernels on Visual Vocabularies for Image Categorization," in Proc. of the IEEE Conf on Computer Vision and Pattern Recognition (CVPR), Minneapolis, MN, USA (Jun. 2007).
Zheng, et al., "Tour the World: Building a web-scale landmark recognition engine," IEEE Computer Society Conference, 2009.
U.S. Appl. No. 12/045,807, filed Mar. 11, 2008, Perronnin.

(Continued)

*Primary Examiner* — Wenpeng Chen
*Assistant Examiner* — Feng Niu
(74) *Attorney, Agent, or Firm* — Fay Sharpe LLP

(57) ABSTRACT

A system and method are provided for modeling a chromatic object, such as an image. For a set of colors of a chromatic object that are expressed as color values in a perceptual color space, the method includes optimizing a convex objective function which is a log likelihood function of a combination of weighted kernels centered on each color in the set over each of the other colors in the set. A number $N_c$ of weighted kernels in the optimized function which each have a weight which is at least greater than 0 is identified. The chromatic object is modeled with a mixture model in which the complexity of the model is based on the identified number $N_c$.

27 Claims, 3 Drawing Sheets

OTHER PUBLICATIONS

U.S. Appl. No. 12/890,049, filed Sep. 24, 2010, Skaff, et al.
U.S. Appl. No. 12/693,795, filed Jan. 26, 2010, Skaff, et al.
U.S. Appl. No. 12/632,107, filed Dec. 7, 2009, Marchesotti, et al.
U.S. Appl. No. 12/512,209, filed Jul. 30, 2009, Perronnin, et al.
Jegou, et al. "Improving Bag-of-Features for Large Scale Image Search," in IJCV, 2010.

* cited by examiner

US 8,379,974 B2

CONVEX CLUSTERING FOR CHROMATIC CONTENT MODELING

CROSS REFERENCE TO RELATED PATENTS AND APPLICATIONS

The following copending applications, the disclosures of which are incorporated herein in their entireties by reference, are mentioned:

U.S. patent application Ser. No. 12/890,049, filed Sep. 24, 2010, entitled SYSTEM AND METHOD FOR IMAGE COLOR TRANSFER BASED ON TARGET CONCEPTS, by Sandra Skaff, et al.

U.S. patent application Ser. No. 12/693,795, filed on Jan. 26, 2010, entitled A SYSTEM FOR CREATIVE IMAGE NAVIGATION AND EXPLORATION, by Sandra Skaff, et al.

U.S. patent application Ser. No. 12/632,107, filed Dec. 7, 2009, entitled SYSTEM AND METHOD FOR CLASSIFICATION AND SELECTION OF COLOR PALETTES, by Luca Marchesotti, et al.

BACKGROUND

The exemplary embodiment relates to image processing, image presentation, photofinishing, and related arts. It finds particular application in connection with modeling of the chromatic content of a chromatic object, such as an image, and will be described with particular reference thereto.

Chromatic objects, such as images and color palettes, include chromatic content in the form of a set of colors, such as pixels in the case of images and color swatches in the case of color palettes. There are many applications where it is desirable to model the chromatic content of the object, for example, for color transfer from one object to another, for color-based object retrieval, and color-based object classification. In the case of images, for example, the image may include a large number of pixels. It is desirable to generate a representation of the colors of these pixels which can reduce memory storage and retrieval time, but which also serves as a meaningful representation of the actual chromatic content of the object.

Conventionally, there are many methods for modeling images. A traditional approach is to assume that the pixel values in a given color space, such as RGB, Lab, XYZ, or the like, have been generated by a probabilistic model. The model can be discrete or continuous. In the discrete case, an image can be described by a color histogram in which each pixel is quantized, i.e., is assigned to a discrete bin. In the continuous case, the image is modeled by a mixture model, which is generally a Gaussian mixture model (GMM) comprising a weighted set of Gaussian functions. One problem which arises with both these methods is in setting the complexity of the model (the number of bins in the case of the discrete model or the number of Gaussian functions in the continuous model). Since images and color palettes can have widely differing color distributions, there may not be a good complexity setting which fits all of the objects well. In the case of color transfer, for example, the number of Gaussian functions selected can result in artifacts, which results in the color transferred image appearing unnatural.

There remains a need for a system and method which allows the complexity of a model to be set automatically.

INCORPORATION BY REFERENCE

The following references, the disclosures of which are incorporated herein in their entireties by reference, are mentioned:

U.S. Pub. No. 20090231355, published Sep. 17, 2009, entitled COLOR TRANSFER BETWEEN IMAGES THROUGH COLOR PALETTE ADAPTATION, by Florent Perronnin, discloses an image adjustment method. The method includes adapting a universal palette to generate input image and reference image palettes statistically representative of pixels of input and reference images. Some of the pixels of the input image are adjusted to generate adjusted pixels that are statistically represented by the reference image palette.

U.S. Pub. No. 20100088073, published Apr. 8, 2010, entitled FAST ALGORITHM FOR CONVEX OPTIMIZATION WITH APPLICATION TO DENSITY ESTIMATION AND CLUSTERING, by Florent Perronnin, et al., discloses a method of maximizing a concave log-likelihood function. The method includes selecting a pair of parameters from a plurality of adjustable parameters of a concave log-likelihood function and maximizing a value of the concave log-likelihood function respective to an adjustment value to generate an optimal adjustment value. The value of one member of the selected pair of parameters is increased by the adjustment value and the value of the other member of the selected pair of parameters is decreased by the adjustment value. Values of the plurality of adjustable parameters are updated by increasing the value of the one member of the selected pair of parameters by the optimized adjustment value and decreasing the value of the other member of the selected pair of parameters by the optimized adjustment value. The selecting, maximizing, and updating for different pairs of parameters is repeated to identify optimized values of the plurality of adjustable parameters.

The following references relate generally to visual classification and image retrieval methods: U.S. Pub. Nos. 20030021481, 2007005356, 20070258648, 20080069456, 20080240572, 20080317358, 20100040285, 20100092084, 20100098343; U.S. application Ser. Nos. 12/512,209 and 12/693,795; Perronnin, F., Dance, C., "Fisher Kernels on Visual Vocabularies for Image Categorization," in Proc. of the IEEE Conf on Computer Vision and Pattern Recognition (CVPR), Minneapolis, Minn., USA (June 2007); Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009; Nerve Jegou, Matthijs Douze, and Cordelia Schmid, "Improving Bag-Of-Features for Large Scale Image Search," in IJCV, 2010.

BRIEF DESCRIPTION

In accordance with one aspect of the exemplary embodiment, a method for modeling a chromatic object includes, for a set of colors of a chromatic object that are expressed as color values in a perceptual color space, optimizing a convex objective function which is a log likelihood function of a combination of weighted kernels. Each kernel is centered on one of the respective colors in the set and is based on distances to each of the other colors in the set. The method further includes identifying a number of weighted kernels in the optimized function which have a weight which is at least greater than 0, and modeling the chromatic object with a mixture model in which the complexity of the model is based on the identified number.

In accordance with another aspect, a system for modeling a chromatic object includes a color space transformation component which for a set of colors of a chromatic object that are not expressed as color values in a perceptual color space, transforms each color in the set of colors to color values in a perceptual color space, a convex clustering component which applies a convex objective function which is a log likelihood function of a combination of weighted kernels to identify a number of weighted kernels in the optimized function which have a weight which is at least greater than 0, and a modeling component which generates a chromatic model of the chromatic object using the identified number as its complexity.

In another aspect of the exemplary embodiment, a method for modeling an image includes, for a representative set of colors of the image, expressing each of the colors as color values in a perceptual color space. With an algorithm the method includes optimizing, through a plurality of iterations, a convex objective function which has a single optimum value, the optimization of the convex optimizing function outputting a set of $N_c$ non-zero weighted kernel functions and modeling the chromatic object with a mixture model comprising exactly $N_c$ weighted functions.

DETAILED DESCRIPTION

Figure 1:
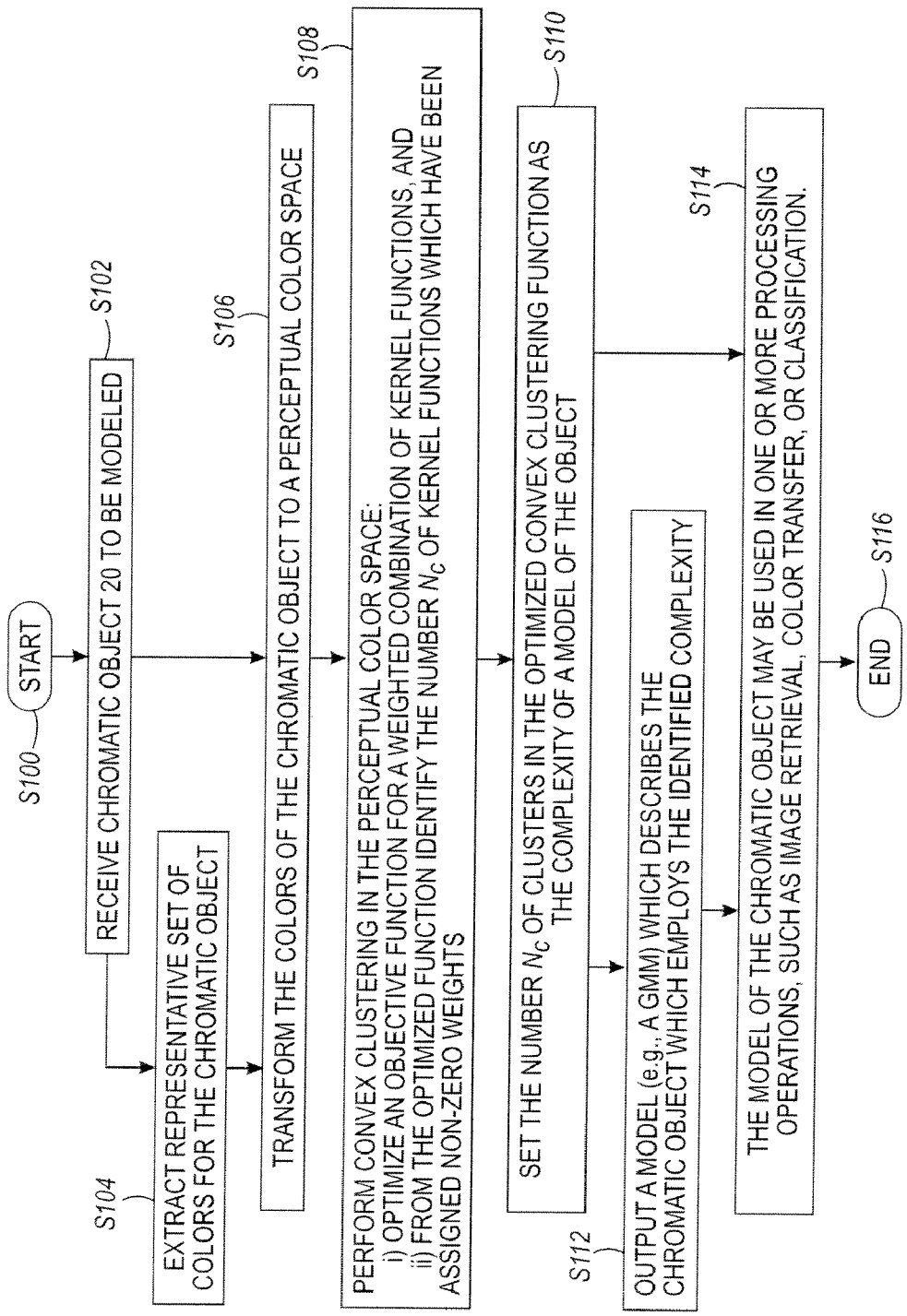
FIG. 1 is a flow diagram illustrating a method for modeling a chromatic object in accordance with one aspect of the exemplary embodiment.

The exemplary embodiment relates to a system and method for automatically computing a value for the complexity for a model of a chromatic object (or simply an "object") as a function of the chromatic content of the chromatic object. The exemplary method includes performing convex clustering of the colors (or a representative set thereof) of a chromatic object, such as an image or chromatic concept (color palette). The output of the clustering is a number $N_c$ of weighted functions, such as GMMs, the number being output automatically. The number $N_c$ is then adopted as the complexity of the model representing the object. In the case of a GMM, the exemplary method automatically sets the number $N_c$ of Gaussian functions ("Gaussians"). In this way, models of a plurality of images can be generated automatically which have different complexities according to the chromatic content of the respective images.

The convex clustering optimizes a convex clustering function. A convex clustering function is one which has no more than a single, "global" optimum solution rather than potentially two or more local optima (maxima or minima). As will be appreciated, the terms "optimization," "minimization," and similar phraseology are to be broadly construed as one of ordinary skill in the art would understand these terms. For example, the term "optimize" is not to be construed as being limited to obtaining the absolute global optimum value. For example, optimization of a convex function may employ an iterative minimization or maximization algorithm that terminates at a stopping criterion before the absolute maximum (or minimum) is reached and/or employs a pruning technique which could, in rare cases, eliminate the absolute optimum solution.

The convex clustering is performed in a perceptual color space in which a distance measure (such as the Euclidean distance) between colors corresponds to a human perceptible color difference. Such a color space is a luminance-chrominance color space with a luminance (brightness) component and two chrominance components, such as Lab (e.g., the CIELAB color space L*a*b), CIEXYZ, YCbCr, YUV, YIQ, YES, or LUV. Where the chromatic object to be modeled is not expressed in a perceptual color space, it may be converted to such a color space.

In the exemplary embodiment, the color information of an input image is received in RGB color space. In RGB color space, each pixel's color is determined by a red component, a green component, and a blue component. This information is converted to a color space having a luminance or brightness component value, e.g., L, and two or more chrominance component values, (e.g., a,b) which refer to hue and saturation values. For example, the image data may be input in RGB values and converted to a Lab luminance-chrominance color space. Various methods exist for converting image data from one color space to another. For example, a color space conversion component may include a look up table or other data structure to which the RGB image data is fed, which outputs the corresponding luminance-chrominance values. In some embodiments, the luminance component may be ignored for the purposes of the exemplary clustering method. Thus in the case of Lab, only the a and b components are used.

A "digital image" (or simply "image") can be in any convenient file format, such as JPEG, Graphics Interchange Format (GIF), JBIG, Windows Bitmap Format (BMP), Tagged Image File Format (TIFF), JPEG File Interchange Format (JFIF), Delrin Winfax, PCX, Portable Network Graphics (PNG), DCX, G3, G4, G3 2D, Computer Aided Acquisition and Logistics Support Raster Format (CALS), Electronic Arts Interchange File Format (IFF), IOCA, PCD, IGF, ICO, Mixed Object Document Content Architecture (MO:DCA), Windows Metafile Format (WMF), ATT, (BMP), BRK, CLP, LV, GX2, IMG (GEM), IMG (Xerox), IMT, KFX, FLE, MAC, MSP, NCR, Portable Bitmap (PBM). Portable Greymap (PGM), SUN, PNM, Portable Pixmap (PPM), Adobe Photoshop (PSD), Sun Rasterfile (RAS), SGI, X BitMap (XBM), X PixMap (XPM), X Window Dump (XWD), AFX, Imara, Exif, WordPerfect Graphics Metafile (WPG), Macintosh Picture (PICT), Encapsulated PostScript (EPS), or other common file format used for images and which may optionally be converted to another suitable format prior to processing. Digital images may be individual photographs, graphics, video images, or combinations thereof. In general, each input digital image includes image data for an array of pixels forming the image. The exemplary embodiment is not intended for black and white (monochrome) images, although it could be modified to allow incorporation of such images. In displaying or processing an image, a reduced pixel resolution version ("thumbnail") of a stored digital image may be used, which, for convenience of description, is considered to be the image.

A "color palette," as used herein, is a limited set of different colors, which may be displayed as an ordered or unordered sequence of swatches, one for each color in the set. A "predefined color palette" is a color palette stored in memory. The colors in a predefined color palette may have been selected by a graphic designer, or other skilled artisan working with color, to harmonize with each other, when used in various combinations. In general, the predefined color palettes each include at least two colors, such as at least three colors, e.g., up to thirty colors, such as three, four, five, or six different colors. These colors may have been manually selected, in combination, to express a particular aesthetic concept. In some embodiments, a predefined color palette may be automatically generated, e.g., based on a set of manually defined color palettes, as described, for example, in above-mentioned application Ser. No. 12/890,049. Each predefined color palette may have the same number (or different numbers) of visually distinguishable colors. Predefined color palettes may be tagged with a corresponding label related to an aesthetic concept. The aesthetic concepts may include emotions, moods and other aesthetic concepts, such as capricious, classic, delicate, earthy, elegant, romantic, luscious, playful, robust, sensual, serene, spicy, spiritual, and warm (see, for example, the list of concepts in Eiseman, L., Pantone Guide to Communicating with Color Graffix Press, Ltd., 2000). As for images, the color palettes may be converted to the perceptual color space, such as the a and b components of the Lab color space prior to performing the convex clustering.

The exemplary system and method provide a perceptually-motivated probabilistic approach to modeling the chromatic content of an image. By perceptually motivated, it is meant that pixels are grouped according to a perceptual measure of similarity. The exemplary clustering algorithm described below has a single parameter σ to tune. This parameter has an intuitive perceptual interpretation.

Figure 2:
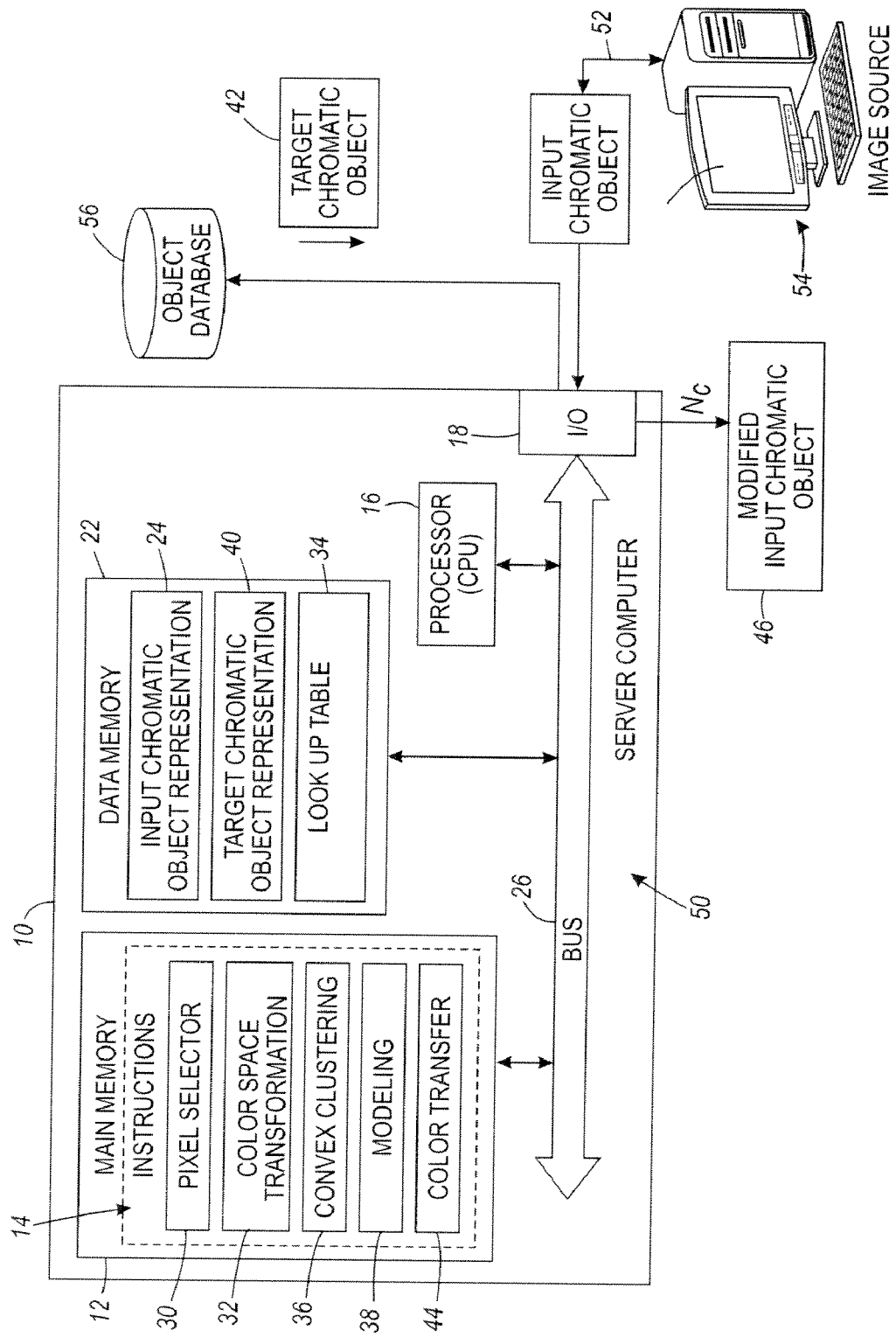
FIG. 2 is a functional block diagram illustrating a system for modeling a chromatic object in accordance with another aspect of the exemplary embodiment.

With reference now to FIG. 1, an exemplary computer-implemented method is illustrated which may be implemented with a computer system as illustrated in FIG. 2. The method begins at S100.

At S102, a chromatic object to be modeled is received.

At S104, a representative set of colors for the chromatic object may be obtained. This step may be omitted for a chromatic object with relatively few colors, such as a color palette, where all colors can be used.

At S106, the colors of the chromatic object are each transformed to a perceptual color space, i.e., a space where the Euclidean distance correlates with the human perception of color, if not already in such a color space. While in the exemplary embodiment, reference is made to Lab as the perceptual color space, other perceptual color spaces may be used, as noted above.

At S108, convex clustering is performed in the perceptual color space. This step may include optimizing an objective function for a weighted combination of kernel functions and from the optimized function identifying the number $N_c$ of kernel functions which have been assigned non-zero weights. The optimization may be performed with an Expectation-Maximization (EM) algorithm or a Pair-wise optimization algorithm. In either case, one or more pruning methods may be adopted to speed up the optimization algorithm.

At S110, the number $N_c$ of clusters in the optimized convex clustering function is identified.

At S112, a model which describes the chromatic object may be output, the exemplary model having a complexity which is based on the complexity identified at S110. The model can be a mixture model, such as a Gaussian Mixture Model (GMM) which may include no fewer than and/or no more than $N_c$ weights/weighted functions, e.g., exactly $N_c$ weights/weighted functions.

Figure 3:
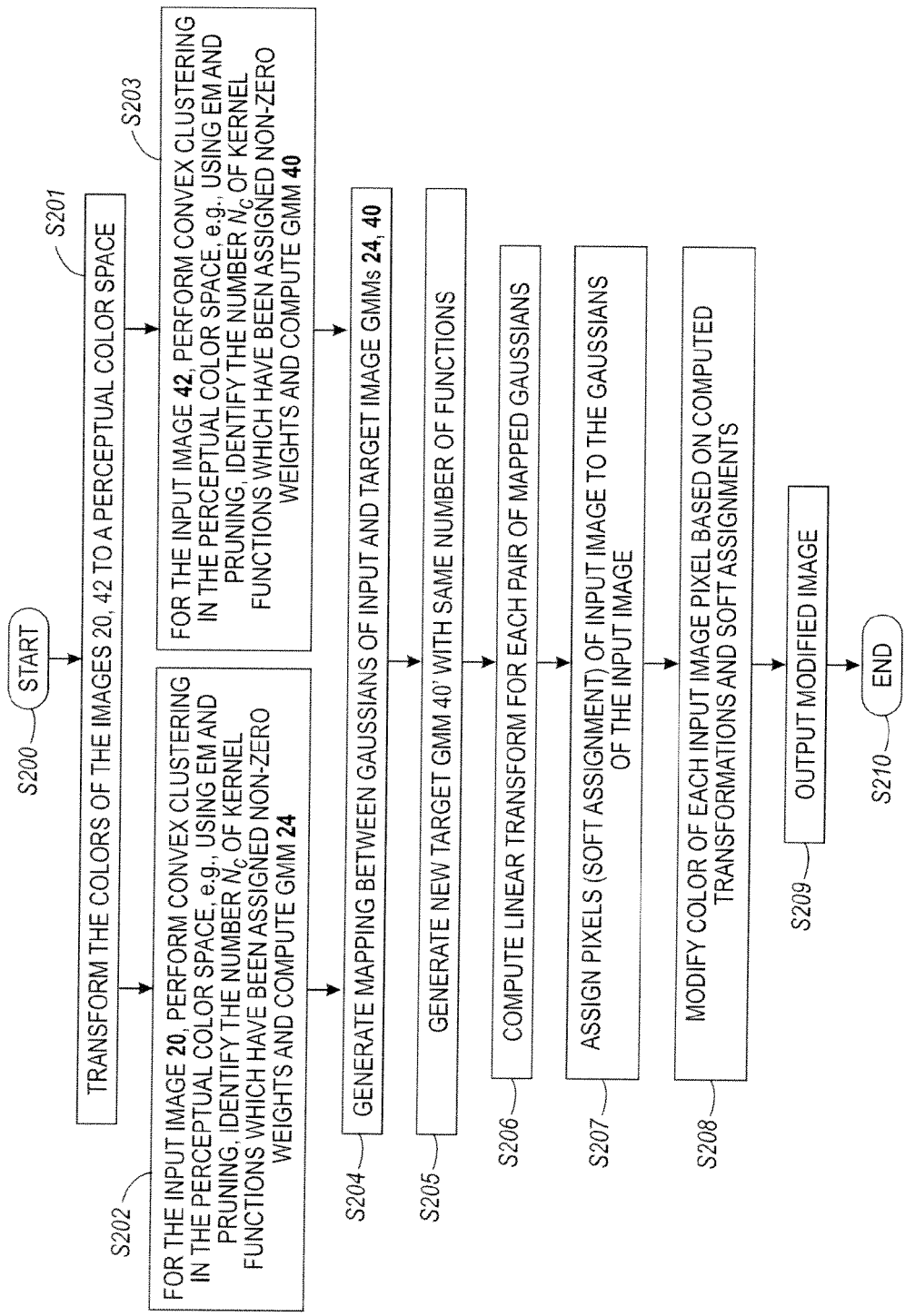
FIG. 3 is a flow diagram illustrating a method for color transfer in accordance with another aspect of the exemplary embodiment.

At S114, the model of the chromatic object may be used in one or more processing operations, such as image retrieval, color transfer, or classification. An example of a color transfer application is described below with reference to FIG. 3.

The method ends at S116.

FIG. 2 illustrates an exemplary computer implemented system 10 which can be used for performing the method illustrated in FIG. 1. The exemplary system includes main memory 12 which stores software instructions 14 for performing the exemplary method and a processor 16, in communication with the memory 12, for executing the instructions 14. An input/output (I/O) device 18 receives one or more chromatic objects 20 which may be stored in data memory 22 of the system 10 during processing. The system 10 outputs a complexity, which is a positive integer $N_c$ of at least 1, and can be, in some cases, at least 2 or at least 3, for example, up to about 100, and which can be used as the complexity of a mixture model 24 representing the object. Hardware components 12, 16, 18, 22, may communicate via a data/control bus 26.

The system 10 may alternatively or additionally output the model 24 for the chromatic object 20. The model 24 serves as a representation of the chromatic object which can be compared with like representations of other chromatic objects. The model 24 has a complexity which is based on the value of $N_c$, for example, may use exactly the same complexity (same numerical value) as the value $N_c$. The model 24 can be a probabilistic model, such as a GMM.

The instructions 14 may include a pixel selector 30 which selects a representative set of pixels from the chromatic object 20 in the case where the chromatic object is an image. A color space transformation component 32 converts the pixel colors from a three or four dimensional input color space, such as RGB, into a two or three dimensional perceptual color space, such as Lab, e.g., by accessing a data structure 34, such as a look up table, stored in memory 22. A convex clustering component 36 optimizes a convex objective function based on the color values of the pixels in the perceptual color space and optionally outputs a complexity $N_c$. A modeling component 38 generates a model 24 of the chromatic object based on the complexity $N_c$ and optionally outputs the model 24, which serves as a representation of the input chromatic object 20. In some cases, the model 24 may simply be the set of non-zero weighted functions of the optimized objective function.

The system 10 may also be configured for performing further processing. For example, in the case of color transfer, the system 10 may be configured for computing a target model 40 for a target chromatic object 42 in the same manner as for the input object 20 using some or all of components 30, 32, 34, 36, and 38. Optionally, a color transfer component 44 computes a color transformation for transforming the colors of the input object 20, based on the respective models 24, 40 of the two objects 20, 42 and applies the computed color transformation to the colors of the input object 20 to generate a color transformed object 46, which may be output, to an output device 48, such as a display, printer, or the like. The target object 42 used for the color transfer can be the same type of object as the input object 20, or may be of a different type. For example the input object 20 may be an image and the target object 42 may be either an image or a color palette, or vice versa. The two objects 20, 42 can have the same or a different complexity $N_c$.

The system 10 may be implemented in one or more specific or general purpose computing devices 50, such as a PC, such as a desktop, a laptop, or palmtop computer, portable digital assistant (PDA), server computer, cellular telephone, digital camera, pager, or other computing device capable of executing instructions for performing the exemplary method. In the exemplary embodiment, the system is resident on a server computer 50, which is communicatively linked, e.g., via a wired or wireless link 52, such as the Internet, to a client computing device 54. A user accesses the server computer, e.g., via a web browser, selects a chromatic object 20, e.g., from the user's own collection, e.g., stored in memory of computing device 54, or from a remote database 56, and uploads it to the server computer 50 for processing. A target object 42 may also be selected by the user, from the same or a different memory storage device. Depending on the selected task, the server computer 50 may return a color transferred image 46 or, in the case of image retrieval, a set of similar images, based on a comparison between the model 40 of the input image and models 40 of images 42 stored in a database 56. As will be appreciated, the user's computer 54 may be similarly configured to the server computer 50, with memory, a processor, a system bus, and appropriate software/hardware for displaying chromatic objects on the display 48 and for receiving user inputs, e.g., from one or more input devices(s), such as a cursor control device, keyboard, keypad, touch screen, joystick, voice activated control device, or combination thereof.

The memory 12, 22 may be combined or separate and may represent any type of non-transitory computer readable medium, such as random access memory (RAM), read only memory (ROM), magnetic disk or tape, optical disk, flash memory, holographic memory, or combination thereof. In one embodiment, the memory 12, 22 comprises a combination of random access memory and read only memory. Database 56 may be stored in memory 22 or in remote memory communicatively linked to the system 10, e.g., via the Internet. In some embodiments, the processor 16 and memory 12 and/or 22 may be combined in a single chip. The network interface(s) 18 allow the computer 50 to communicate with other devices via a computer network, such as a local area network (LAN) or wide area network (WAN), or the Internet, and may comprise a modulator/demodulator (MODEM). An analogous network interface (not shown) is provided on the user's computer 54.

The digital processor 16 can be variously embodied, such as by a single-core processor, a dual-core processor (or more generally by a multiple-core processor), a digital processor and cooperating math coprocessor, a digital controller, or the like. The exemplary digital processor 16, in addition to controlling the operation of the computer 50, executes the instructions 14 stored in memory 12 for performing the method outlined in FIG. 1.

The presented method and system can be integrated in a creative image search engine for retrieving images catering to graphic designers as described, for example, in above-mentioned copending application Ser. No. 12/693,795 and/or for color transfer, as described, for example, in copending application Ser. No. 12/890,049, the disclosures of which are incorporated herein by reference.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The method illustrated in FIG. 1 may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 1, can be used to implement the method for computing the complexity of a chromatic object, generating a representation of the object based thereon, and other processing steps as described above.

Various aspects of the system and method will now be described.

A. The Input Chromatic Object

The input chromatic object 20 can be an image, such as a photograph, or a color palette, as described above. The image or color palette 20 may be input from any suitable source, such as a disk, flash memory, wired or wireless linked database, or from system memory. In the case of an image, the input object 20 may include an array of many millions of pixels, each pixel having a color expressed as colorant values for two or more colorant dimensions, such as R, G, and B. At S104, a set of these pixels may be randomly selected as being representative of the colors in the image, such as at least 100 and in one embodiment less than 10,000, e.g., 1000 or 2000 of the pixels. These representative pixels (colors) can be drawn from throughout the image or from a portion thereof, such as user-selected portion of the image. Alternatively, pixels of a thumbnail (reduced pixel resolution) version of the image may be used to represent the image. The exemplary clustering algorithm is quadratic in the number of pixels, and thus computation time increases dramatically as the number of pixels increases. Selecting a subset of the pixels of a chromatic object 20 thus reduces the computation time. However, this may be omitted if the number of colors in the chromatic object is relatively small (e.g., in the case of a color palette) and/or if computation time is not an issue. In generating the model 24, the chromatic object 20 is simply treated as a bag of pixels (color values), without reference to the order of these pixels in the image or color palette 20.

If the input object 20 is not in a perceptual color space, the entire input object, or just the representative set of pixels identified at S104, is converted to the perceptual color space at S106. As will be appreciated, this step could alternatively be performed prior to step S104.

Steps S104 and S106 may also be performed, as appropriate, for one or more target chromatic objects 42. Alternatively, a model 40 of the target object may be generated by another method.

B. Convex Clustering (S108)

Step S108 of the method will now be described.

1. The Convex Clustering Objective Function

Let $\{x_n, n=1 \ldots N\}$ be a set of N points (e.g., pixel color values) to be clustered. If the points are represented in the Lab color space, the vectors $x_n$ are 3-dimensional. If the pixel representation is restricted to the a,b part of the Lab color space (to focus on the chromatic content and discard most of the luminance-related information) then the vectors $x_n$ are 2-dimensional.

In convex clustering, a kernel k is centered on every point $x_m$. In this way, all points are potential cluster centers. The kernels k can be Mercer kernels, which are positive, semi-definite kernels (i.e., the eigenvalues of a matrix for kernel similarities are always non-negative) such as Gaussian kernels, although other kernels are contemplated. The Gaussian kernel is well suited to working in a color space where the Euclidean distance correlates with human perception. The kernel for each point $x_m$ is assigned a weight $w_n$.

The convex objective function is a sum of log likelihood values. Each log likelihood value is a convex combination of weighted kernels, each kernel being centered on a respective point (e.g., pixel or swatch color), evaluated at a different point (color), e.g., based on distance between the two points. There is thus (prior to optimization) one kernel established for every color in the set of colors representative of the chromatic object.

The convex objective function to be optimized can thus be represented as follows:

$$L = \Sigma_{m=1}^{N} \log(\Sigma_{n=1}^{N} w_n k_n(x_m)) \quad (EQ1)$$

with respect to the $w_n$'s under the following set of constraints:

$$0 \leq w_n \leq 1, \quad (EQ2)$$

$$\Sigma_{n=1}^{N} w_n = 1 \quad (EQ3)$$

These constraints require each weight to have a value from 0 to 1 and for all the weights to sum to 1. Obviously, some other predefined value could be used in place of 1.

The exemplary convex objective function has a global (single one) optimal solution, although it is to be appreciated that in some cases, this optimal solution may not be reached exactly.

$k_n(x_m)$ denotes a kernel between a point having index n and point $x_m$. The values $k_n(x_m)$ are non-negative and express a similarity between points $x_m$ and $x_n$ where $x_n$ represents any point other than $x_m$. Since the Euclidean distance $(x_n - x_m)$ between the two color vectors is a suitable distance measure in the Lab space, Gaussian kernels $k_n(x_m)$ can be used as the similarity measure between $x_m$ and $x_n$.

Generally, the kernel can be a function:

$$k_n(x_m) = f_\sigma(\|x_n - x_m\|)$$

where $f_\sigma$ represents some function of a variable $\sigma$, and more specifically, the Gaussian kernels can be computed according to the expression:

$$k_n(x_m) = \frac{1}{(2\pi)^{D/2} \sigma^D} \exp\left\{-\frac{\|x_n - x_m\|^2}{2\sigma^2}\right\} \quad (EQ\ 4)$$

where $\sigma$ is the standard deviation of the kernel and D is the dimensionality of the vectors $x_n$ (i.e., typically D=2 or 3). In the exemplary embodiment, $\|x_n - x_m\|^2$ is the squared Euclidian distance, although other exponents are contemplated: $(\|x_n - x_m\|^y)$, where y is a number greater than 1.

The kernel of EQ4 is normalized. Using a normalized kernel (i.e., a kernel k such that $\int_x k(x)dx = 1$) provides a probabilistic interpretation of convex clustering: $\Sigma_{n=1}^{N} w_n k_n$ is a probability density function (more precisely a GMM in the case of the Gaussian kernel) and the function L of (EQ1) is a log-likelihood objective function. Other kernels which are a function of distance (e.g., Euclidian distance) between point $x_n$ and the other points $x_m$ are also contemplated.

The output of the optimization step is a set of $N_c$ weighted Gaussian kernels $(w_n k_n(x_m))$ for which $w_n$ is non-zero. In the case of images, where the number of colors may be 1000 or more, $N_c$ is substantially less than N. For example, $N_c \leq N/2$, e.g., $N_c \leq N/10$. In the case of a color palette, $N_c$ may be closer to N and in some cases equal to N. The $N_c$ weighted Gaussian kernels constitute a GMM with a covariance matrix which is isotropic.

2. Properties of Convex Clustering

Convex clustering has several attractive properties for the exemplary method, as follows:

a. The objective function is convex in $w_n$ and thus there is a unique maximum. This is to be contrasted with the traditional GMM learning which is non-convex and therefore plagued with local maxima.

b. The solution is sparse, meaning that most of the $w_n$'s are typically zero. The points associated with non-zero $w_n$'s are cluster centers. Hence, there is no need to set the number of clusters as the algorithm discovers this parameter automatically.

c. There is a single parameter to tune: the standard deviation $\sigma$ of the Gaussian kernel. This parameter is intuitive as it defines a notion of perceptual similarity in the color space. The higher the value $\sigma$, the further away (in terms of Euclidean distance) two colors should be in the color space to be considered dissimilar, and the smaller the number of clusters obtained with convex clustering. Conversely, the smaller the value $\sigma$, the closer two colors should be in the color space to be considered similar, and the larger the number of clusters obtained with convex clustering.

The value of the parameter $\sigma$ can be selected empirically. In general, there may not be a single value that fits all possible applications and scenarios. However, a value $\sigma$ can be readily found that gives reasonable results. For example, $\sigma$ may be at least 1 or at least 10 or at least 20, and can be up to 10000 or up to 1000 or up to 500. For example, in the case of color transfer, a suitable value was found to be $\sigma = 100$. This value leads to a widely varying number of Gaussians depending on the content of the images.

3. Solving the Convex Clustering Problem

The convex clustering problem can be solved by the component 36 with an algorithm.

Two existing algorithms are suggested by way of example for solving the convex clustering problem. Improvements to these algorithms are suggested below.

a) EM Optimization:

The convex clustering problem can be solved using an expectation-maximization (EM) algorithm. This algorithm, through one or more iterations, alternates between two steps, an expectation (E) step where the posterior occupancy probabilities are computed based on the current estimates of the parameters and a maximization (M) step where the parameters are updated based on the expected complete-data log-likelihood given the occupancy probabilities computed in the E-step. In the present application, these steps may be computed as follows:

i.) E-step: compute the $N^2$ assignments $\gamma_{mn}$ of point $x_m$ to a Gaussian centered on $x_n$:

$$\gamma_{mn} = \frac{w_n k_n(x_m)}{\sum_{j=1}^{N} w_j k_j(x_m)} \qquad \text{(EQ 5)}$$

$\gamma_{mn}$ is thus the probability than pixel $x_m$ is assigned to Gaussian n and can be computed using Bayes formula.

ii.) M-step: re-estimate the $w_n$ values:

$$w_n = \frac{1}{N} \sum_{m=1}^{N} \gamma_{mn} \qquad \text{(EQ 6)}$$

Steps i.) and ii.) are generally reiterated one or more times, generally, many more times, until convergence is reached. The M-step computes parameters $w_n$ which maximize the expected log-likelihood function (EQ1) generated on the E-step. These parameter-estimates are then used to determine the distribution of the latent variables in the next E-step. The EM algorithm may be iterated for a fixed number of times, such as two, three, or four times or may be iterated until the parameters vary by less than a threshold amount between iterations. Such an iterative maximization algorithm that terminates at a stopping criterion before an absolute maximum is reached is nonetheless considered to optimize or best fit the data.

For further details on this approach, see, for example, D. Lashkari and P. Gotland, "Convex clustering with examplar-based models", NIPS, 2007 (hereinafter "Lashkari 2007").

For the first E step, the values $w_n$'s may be initialized to some initial value. To ensure convergence to the optimal solution, all $w_n$'s may be initialized to non-zero values. For example, the $w_n$'s are uniformly initialized. As the number of iterations increases, most of the $w_n$'s converge to zero and the number of clusters/Gaussians is therefore reduced. One disadvantage of the EM algorithm is that it can be slow to converge, especially as the $w_n$ values approach zero. Two approaches are proposed for speeding up the convergence (pairwise optimization and pruning), without unduly compromising the result. These may be performed individually or in combination.

b) Pair-Wise Optimization

In this method, an optimization algorithm may be implemented, as follows:

i.) Choose randomly a pair of points $(x_m, x_n)$ such that $w_m \neq 0$ or $w_n \neq 0$.

ii.) Transfer an optimal quantity of weight between $w_m$ and $w_n$, i.e., find a quantity of weight $\delta$ to be transferred such that the updated weights $w_m + \delta$ and $w_n - \delta$ maximize the log-likelihood function L.

Steps i. and ii. are repeated until a convergence criterion is met, such as the completion of a predetermined number of iterations or when the improvements in the optimized function L. are not significant. This optimization method is described further in 20100088073.

As will be appreciated, if all weights have been initially assigned the same non-zero value, step i.) may be omitted in the first iteration or the EM algorithm described above may be iterated one or more times until different values of $w_n$ are generated.

This algorithm is orders of magnitude faster than the EM-based approach at converging to a good solution (i.e., a solution whose log-likelihood L is within a small values of a maximum value L*). Indeed, during the first few iterations, any choice of a pair of points will increase the objective function. However, as the algorithm approaches the optimum, the chances of randomly choosing a pair of points that leads to an increase in the objective become smaller and smaller.

c) Improvements:

Pruning can be used to speed both algorithms. This method works on the assumption that if it was known before iterating one or more steps of the algorithm which values $w_n$ would converge to zero, then both EM and pair-wise optimization algorithms could be sped up by initializing these values to zero. Since this knowledge is unavailable, one approach is to estimate which values $w_n$ will converge to zero and prune them early (i.e., remove unlikely cluster candidates) by adding a third step to both algorithms. To do this, a threshold condition may be established and applied to all weights.

First Pruning Method: The following pruning rule may be applied after the M-step in one or more of the iterations:

iii.) pruning step: all the $w_n$'s which are below a given threshold $\theta$ are set to zero. The threshold condition in this case is a predetermined value of $w_n$. For example, $\theta = 1e^{-3}/N$. See, for example, Lashkari 2007.

However, this modification only has a limited impact on the speed of convergence. This is because only a very small fraction of $w_n$'s are zeroed at each pruning step.

Second Pruning Method: An alternative pruning scheme which can significantly improve the convergence rate will now be described. This method involves zeroing (setting to 0) a proportion of the $w_n$ values without compromising the optimality of the solution.

As will be appreciated, if $w_n \neq 0$, then $x_n$ is a cluster center (at least for that iteration). It is to be expected that $x_n$ will be assigned with higher probability to its own cluster than to any other one. This can be translated as follows:

$$\text{for all } m \neq n \gamma_{nn} > \gamma_{nm} \text{ or } w_n = 0 \qquad \text{(EQ7)}$$

Therefore, the following pruning step iii.) can be used as a third step in one or more of the iterations in both algorithms (EM and Pairwise):

iii.) if there exists an index $m$ such that $\gamma_{nn} \leq \gamma_{nm}$ then
set $w_n = 0$ (EQ8)

In general, this results in a significant proportion, e.g., at least one third or at least one half of the $w_n$ being set to 0. Once set to zero, these $w_n$s can be dropped from the algorithm, i.e., are always 0.

In the case of pairwise optimization, the second pruning method can be performed by choosing a pair of points (m,n) and performing optimization, then determining whether the condition of (EQ7) is met or not. If not, $w_n$ is set to 0.

As will be appreciated, when a pruning step is employed in the method, such as one or both of the two described above, there is no assurance that the algorithm can converge to the optimal solution. However, in practice, from experiments on synthetic and real data, it has been observed that the log-likelihood of the solution found using the second pruning method is on par with that obtained when the un-pruned EM algorithm is run for a very large number of iterations.

With the second pruning method, the EM and pair-wise optimization schemes are very fast to converge. This is because the pruning step is very aggressive and sets a large number of $w_n$s to zero.

In one embodiment, the computation associated with different clusters can be assigned to different processors (e.g., to different CPUs or cores of the same processor), speeding up the processing further.

The convex clustering step thus described aims to cover the color space bounding the representative colors of the chromatic object with a set of non-overlapping kernel functions (e.g., Gaussian functions). The more disparate the colors in the chromatic object, the larger the number of non-zero weighted functions are likely to be found in the optimized objective function. This is often observed in the case of color palettes as chromatic objects, which may often be best modeled with 5 or more Gaussian functions.

C. Chromatic Object Model

The model 24, 40 of the chromatic object 20, 42 has a complexity which is based on the number $N_c$ of non-zero weighted functions, for example, may use the same numerical value as the value of $N_c$ which is output by the convex clustering step. In other embodiments, the model 24, 42 may apply one or more constraints which exclude complexity values above or below certain thresholds, such as setting the complexity at 50 for value of $N_c$ of 50 or above. The model 24, 42 can be a generative model, such as a GMM. The GMM may be the one corresponding to the optimal solution $w_n k_n$. Or, a new GMM may be generated from the image using the same number $N_c$ of Gaussian functions where the colors of the image/palette 20, 42 serve as the observations. This may involve re-estimating the GMMs using the traditional EM algorithm to obtain non-isotropic covariance matrices. The solution to this re-estimating is generally non-convex, since not all points are considered (i.e., those points for which their weights are set to zero are not considered). In practice, however, it was observed that this additional re-estimation step had little impact on the results in the case of color transfer. It is to be appreciated that other probabilistic models may be employed which use $N_c$ as the complexity.

As will be appreciated, each chromatic object may be assigned a different complexity value which is used in its respective model 24.

In the case of a GMM as the image model 24, 42, the means of the $N_c$ Gaussian functions are each color values, e.g., a vector a,b or L,a,b in the Lab space, or in another perceptually coherent color space. Thus, the model 24, 42 of the chromatic object can be seen as a weighted color palette, where each of the $N_c$ swatches of the palette has a color that corresponds to the mean of a respective Gaussian function and the weight of the swatch represents a relative importance of that swatch's color.

D. Applications

The exemplary model 24 of a chromatic object can be used in a variety of applications where a representation of a chromatic object is to be used. As examples, the exemplary model can be used for identifying similar chromatic objects, such as similar target images, e.g., for image retrieval. Various methods exist for computing the similarity between two Gaussian mixture models. One example of this is the Earth Mover's Distance (EMD), as described, for example, in Ser. No. 12/890,049.

The EMD algorithm attempts to solve the following optimization problem:

$$\min_{\{f_{i,j}\}} \sum_{i=1}^{M} \sum_{j=1}^{N} f_{i,j} G(S_i^{in}, S_j^c)$$

This may be subject to the following constraints:

$$\sum_{i=1}^{M} f_{i,j} = w_j^c, \ j = 1, \ldots, N \quad (C1)$$

and:

$$\sum_{j=1}^{N} f_{i,j} = w_i^{in} \ i = 1, \ldots, M \quad (C2)$$

where G is the cost matrix containing the Euclidean distance between each input image Gaussian function's mean $S_i^{in}$ and each target image Gaussian function's mean $S_j^c$. The quantities $w_i^{in}$ and $w_j^c$ are the weights for the i-th input and j-th target GMM, respectively. The flow $f_{i,j}$ can be considered to be the part of GMM $S_i^{in}$ which is mapped to $S_j^c$. Constraint (C1) requires that each input image GMM has flows that sum to its weight. Similarly, constraint (C2) requires that each target GMM has flows that sum to its weight. Therefore each target GMM is guaranteed to be associated with at least one input image GMM, and vice versa.

In this way, the most similar image(s) to the input image can be identified. Other methods for computing a comparison measure based on similarity or distance between GMMs are known, such as the probability product kernel, the chi$^2$ distance, the Kullback-Leibler (KL) divergence, the Jensen-Shannon divergence, the Euclidian distance, the Manhattan distance, or the cosine similarity may be used in computing similarity between models.

In another embodiment, the models of an input object and a target object can be used for color transfer. In this approach, color may be transferred from a target object 42 to an input object 20 by mapping colors of the input object (e.g., image) model 24 to colors of the target object (e.g., image) model 40 to identify, for each of the colors of the input image model, a corresponding color in the target image model (e.g., the closest color in terms of its Euclidian distance or as identified using the Earth Mover's Distance). Since the input image model may have different number of colors $N_c$ from the target image model, one target image model color may be mapped to more than one input image model color. A color transformation to be applied to pixels of the input image is then computed based on the mapping. For pixels of the input image, modified color values are computed, based on the computed transformation, to generate a modified image 46. In this way, the content of the image is still recognizable but has different colors. The extent of the color transfer can be adjusted with a parameter(s) which control(s) how aggressively the transfer is applied.

The exemplary chromatic object model 24 can also be used for classification of chromatic objects by color. For example, a classifier is trained to assign an image to one of a plurality of classes (or assigned probabilistically to all classes) based on its model 24. For example, a set of chromatic objects may each be manually assigned to a respective one of a set of classes which reflect moods, such as happy, sad, and so forth, and used to train a classifier to assign images to these classes.

Without intending to limit the scope of the exemplary embodiment, the following Examples illustrate applications of the exemplary system and method.

EXAMPLES

1. Synthetic Data Example

The data for this example consists of 4,000 points drawn randomly from 4 isotropic Gaussians (1,000 points per Gaussian) with σ=1 in a 2D color space. These points formed four substantially non overlapping clusters in the 2D space. The theoretical optimal result for $N_c$ using this set is therefore known (i.e., $N_c$=4 with each weight being 0.25). The EM and pair-wise optimization algorithms were implemented in Matlab. Using the EM method with the first pruning method, after 2 min, the solution contains 150 clusters and the log-likelihood value is −6.2847e+03. The solution found by the pair-wise optimization after 10 s contains 7 clusters and the log-likelihood is −6.2820e+03. The solution found by the EM algorithm with the second pruning method after 3 s contains 4 clusters with approximately equal weights and a log-likelihood of −6.2814e+03. This last embodiment of the algorithm is thus able to identify the 4 clusters very quickly.

2. Application to Color Transfer

The exemplary method for chromatic content modeling was used for color transfer. This involved transferring the chromatic properties of a target object (an image or a concept) to an input image. An exemplary color transfer algorithm is briefly summarized with reference to FIG. 3. This is an adaptation of the method described in above-mentioned application Ser. No. 12/890,049:

The method begins at S200.

At S201, the target colors and input image pixels are converted into a given, perceptually coherent color space, as for S106.

At S202, an input GMM 24 (i.e., a weighted color palette) is estimated from the pixels of the input image 20 using the method outlined for steps S108-S112 using the output $N_c^i$ as the number of Gaussian functions.

At S203, a target GMM 40 (i.e., a weighted color palette) is estimated from the pixels of the target object 42 (the image/predefined color palette whose chromatic content is to be transferred to the input image) using the method outlined for steps S108-S112 using the output $N_c^t$ as the number of Gaussian functions.

At S204, a mapping is found between the Gaussians of the target and input GMMs 24, 40 using the EMD algorithm. The EMD algorithm computes an optimal flow from the input Gaussians to the target Gaussians, as described above.

At S205, a new target GMM 40' (i.e., a target color palette) is generated with the same number of Gaussians as the input GMM 24. In this new target GMM, the i-th target Gaussian is obtained by a weighted average of the target Gaussians in GMM 40 where the weights are the flows (fij's) computed at step S204. Each target Gaussian (i.e., color) in new target GMM 40' is mapped to its corresponding input Gaussian (i.e., color) in input GMM 24.

At S206, a linear transform is computed per pair of input/new target Gaussians.

At S207, each pixel in the input image 20 is assigned in a soft manner to all the Gaussians of the input GMM 24, e.g., inversely proportional to the Euclidian distance from the pixel a,b values to the Gaussian's mean.

At S208, each pixel in the input image is modified by applying a combination of the linear transforms computed at step S206. The combination is weighted by the soft assignments computed at step S207.

At S209, the modified image 46 generated at S208 is output, e.g., to a display screen, a printer, and/or to memory storage. The method ends at S210.

In this Example, the exemplary convex clustering method is used with the EM approach and second pruning method for steps S202 and S203 since it is simple to implement, fully deterministic and can be easily parallelized (by dispatching the computation associated to different clusters on different CPUs). For further details on the steps S204 and S206-S209 of the method, see application Ser. No. 12/890,049.

The results obtained showed an improvement over the color transfer methods of Ser. No. 12/890,049, where a fixed number of Gaussians is selected. In that method, a subset of pixels is grouped into a fixed number of clusters using hierarchical clustering and a Gaussian is placed on each cluster center and EM estimation is performed. For the GMM training using the method of Ser. No. 12/890,049, experiments were performed with two values for the fixed number of clusters/Gaussians: a small value (2) and a large value (16). In the exemplary convex clustering GMM training algorithm, after performing convex clustering, the GMMs were re-estimated using the traditional EM approach (e.g., to obtain non-isotropic covariance matrices), although not really necessary.

Although when a correct number of Gaussians happens to be selected, the results of the Ser. No. 12/890,049 method can be on a par with the present method, the convex clustering method yielded widely different values of $N_c$ for the input images as well as for the target objects (images or palettes). For example, values of $N_c$ from 1 to 37 were found.

Finding a good number of clusters/Gaussians is of particular value in color transfer. If the number of Gaussians is too small in the input GMM 24, relative to the target GMM 40, then perceptually different colors will be mapped to perceptually similar colors. If the number of Gaussians is too small in the target GMM 40, relative to the input GMM 24, then perceptually similar colors will be mapped to perceptually different colors. If the number of Gaussians is too large in both target and input GMMs, then perceptually similar pixels may be assigned to different Gaussians. Therefore, different transforms will be applied and the pixels will become perceptually dissimilar. In the experiments performed, the input and target GMMs generated by the present convex clustering method typically used a different number of Gaussians. Therefore, even if a user were to manually tune these parameters, trying all possible pairs of numbers of Gaussians in the input and target GMMs would be time consuming.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for modeling a chromatic object comprising:
for a set of colors of a chromatic object that are expressed as color values in a perceptual color space, optimizing a convex objective function which is a log likelihood function of a combination of weighted kernels each kernel being centered on a respective one of the colors in the set and being based on distances to each of the other colors in the set;
identifying a number of weighted kernels in the optimized function which each have a weight which is at least greater than 0; and
modeling the chromatic object with a mixture model in which the complexity of the model is based on the identified number.

2. The method of claim 1, wherein the mixture model comprises a Gaussian Mixture model and wherein the identified number corresponds to the number of Gaussians in the mixture model and the mean of each Gaussian function corresponds to a color.

3. The method of claim 1, wherein the chromatic object comprises a photographic image.

4. The method of claim 1, wherein the perceptual color space comprises a space in which one of its dimensions is a luminance dimension.

5. The method of claim 4, wherein the colors are expressed in terms of the non-luminance dimensions.

6. The method of claim 4, wherein the perceptual color space is a Lab color space.

7. The method of claim 1, wherein the kernels are Mercer kernels.

8. The method of claim 1, wherein each kernel is a function of the Euclidian distance between the color on which the kernel is centered and each of the other colors.

9. The method claim 8, wherein the kernels are Gaussian functions.

10. The method of claim 1, wherein the optimization is performed with an expectation maximization algorithm or pairwise optimization.

11. The method of claim 1, wherein the optimization comprises pruning weighted kernels from the convex objective function which fail to satisfy a threshold condition.

12. The method of claim 11, wherein the pruning comprises setting a weight of one of the kernels to 0 for which there exists at least one other color m in the set of colors for which $\gamma_{nn} \leq \gamma_{nm}$ where $\gamma_{nn}$ is the estimated assignment of the color on which the kernel is centered to that color and $\gamma_{nm}$ is the estimated assignment of the color on which the kernel is centered to the other color of the set of colors.

13. The method of claim 1, wherein the convex objective function is a sum of log likelihood values, wherein each log likelihood value is a convex combination of the weighted kernels.

14. The method of claim 1, wherein the convex objective function is expressed as:

$$L = \sum_{m=1}^{N} \log(\sum_{n=1}^{N} w_n k_n(x_m)) \quad (EQ1)$$

where N represents a number of the colors in the set;
$x_m$ represents a color in the set on which a kernel $k_n$ is centered; and
$w_n$ represents a weight associated with kernel $k_n$.

15. The method of claim 14, wherein in the convex objective function the weights $w_n$ are subject to the following set of constraints:

$$0 \leq w_n \leq 1 \quad (EQ2);$$

and $$\sum_{n=1}^{N} w_n = 1 \quad (EQ3).$$

16. The method of claim 1, wherein the modeling of the chromatic object with a mixture model in which the complexity of the model is based on the identified number comprises generating a mixture model comprising $N_c$ weighted functions, where $N_c$ is the number of weighted kernels in the optimized objective function.

17. The method of claim 1, wherein the identified number is less than a number of the colors in the set of colors.

18. The method of claim 1, further comprising outputting at least one of the mixture model and information derived therefrom.

19. The method of claim 1, further comprising transforming a set of colors of a chromatic object that are not expressed as color values in a perceptual color space to the set of colors of the chromatic object that are expressed as color values in the perceptual color space.

20. The method of claim 1, wherein at least one of the optimizing, identifying, and modeling is performed with a computer processor.

21. A method of color transfer comprising:
modeling a first chromatic object with colors of a mixture model generated according to the method of claim 1;
generating pairs of mapped colors, each pair comprising a respective one of a set of colors forming the mixture model of the first chromatic object and a respective one of a set of colors in a mixture model of a second chromatic object;
for each pair of the mapped colors, computing a linear transform between the colors;
assigning colors of the first chromatic object to the set of colors forming the mixture model of the first chromatic object; and
modifying colors of the first chromatic object based on the assignments and the linear transforms.

22. The method of color transfer of claim 21, further comprising printing the first chromatic object with the modified colors.

23. A computer program product comprising a non-transitory recording medium encoding instructions, which when executed on a computer, cause the computer to perform the method of claim 1.

24. A system comprising non-transitory memory which stores instructions for performing the method of claim 1 and a processor, in communication with the memory, for executing the instructions.

25. A system for modeling a chromatic object comprising:
a color space transformation component which for a set of colors of a chromatic object that are not expressed as color values in a perceptual color space, transforms the set of colors to color values in a perceptual color space;
a convex clustering component which applies a convex objective function which is a log likelihood function of a combination of weighted kernels, each kernel being centered on a respective one of the colors in the set and being based on distances to each of the other colors in the set, to identify a number of weighted kernels in the optimized function which have a weight which is at least greater than 0; and
a modeling component which generates a chromatic model of the chromatic object using the identified number as its complexity.

26. The system of claim 25, further comprising a color transfer component for transferring color from a second chromatic object, based on the chromatic model of the first chromatic object and a chromatic model of the second chromatic object.

27. A method for modeling an image comprising:
for a representative set of colors of the image, expressing each of the colors as color values in a perceptual color space;
with an algorithm optimizing, through a plurality of iterations, a convex objective function which has a single optimum value, the optimization of the convex optimizing function outputting a set of $N_c$ non-zero weighted kernel functions; and
modeling the chromatic object with a mixture model comprising exactly $N_c$ weighted functions.

* * * * *